US010808921B2

(12) United States Patent
Heuer et al.

(10) Patent No.: US 10,808,921 B2
(45) Date of Patent: Oct. 20, 2020

(54) MOUNTABLE FIXTURE WITH SENSOR ACTIVATED LIGHTING (71) Applicant: SPECTRUM BRANDS, INC., Middleton, WI (US)

(72) Inventors: Darin Heuer, Anaheim Hills, CA (US); Chasen Beck, Costa Mesa, CA (US); Stephen Blizzard, Mission Viejo, CA (US)

(73) Assignee: Spectrum Brands, Inc., Middleton, WI (US)

( * ) Notice: Subject to any disclaimer, the term of this patent is extended or adjusted under 35 U.S.C. 154(b) by 89 days.

(21) Appl. No.: 15/486,773

(22) Filed: Apr. 13, 2017

(65) Prior Publication Data
US 2017/0343205 A1 Nov. 30, 2017

Related U.S. Application Data (60) Provisional application No. 62/341,809, filed on May 26, 2016.

(51) Int. Cl.
*F21V 33/00* (2006.01)
*A47K 10/04* (2006.01)
*F21V 23/04* (2006.01)

(52) U.S. Cl.
CPC ............ *F21V 33/004* (2013.01); *A47K 10/04* (2013.01); *F21V 23/0464* (2013.01); *F21V 23/0471* (2013.01)

(58) Field of Classification Search
CPC .. A47K 10/04; F21V 23/0464; F21V 23/0471
See application file for complete search history.

(56) References Cited

U.S. PATENT DOCUMENTS 4,901,922 A * 2/1990 Kessener .............. B05B 17/085 239/12
5,036,443 A 7/1991 Humble
(Continued)

FOREIGN PATENT DOCUMENTS

CN 2919774 Y 7/2007
CN 102727123 A 10/2012
(Continued)

OTHER PUBLICATIONS

International Search Report and Written Opinion; Application No. PCT/US2017/033582; dated Aug. 8, 2017.
(Continued)

*Primary Examiner* — Gerald J Sufleta, II
(74) *Attorney, Agent, or Firm* — Merchant & Gould P.C.

(57) ABSTRACT

An illuminating fixture includes forming a hub body, the hub body formed to include a cavity and an opening extending through an end of the hub body. The fixture further includes a mounting plate configured to be secured to the end of the hub body with the opening, and the mounting plate is configured to secure the hub body to an external surface. The hub body and/or the mounting plate includes a transparent portion that can illuminate an area surrounding the fixture. The fixture further includes a system of electronic components including a sensor system, a controller, and a light generating unit. The controller is configured to generate a light beam based on input from the sensor system. The sensor system may include a motion detection sensor and/or an ambient light sensor. An optical assembly of the fixture is configured to direct the light beam through the transparent portion.

16 Claims, 5 Drawing Sheets (56) References Cited

U.S. PATENT DOCUMENTS

| | | | |
|---|---|---|---|
| 5,624,025 A | 4/1997 | Hixon | |
| 5,697,577 A | 12/1997 | Ogden | |
| D419,012 S | 1/2000 | Wiggins | |
| 6,056,233 A | 5/2000 | Von Schenk | |
| 6,135,621 A * | 10/2000 | Bach | E05B 17/10 16/110.1 |
| 6,164,793 A * | 12/2000 | Wu | A47G 19/2227 362/101 |
| 6,171,060 B1 * | 1/2001 | Gajewski | F04D 25/088 416/214 R |
| 6,450,658 B1 * | 9/2002 | Tsuji | F04D 25/088 362/147 |
| 6,578,978 B1 * | 6/2003 | Upton | A47F 3/001 362/125 |
| 6,805,458 B2 | 10/2004 | Schindler | |
| 7,008,073 B2 | 3/2006 | Stuhlmacher | |
| 7,303,300 B2 | 12/2007 | Dowling et al. | |
| 7,434,960 B2 | 10/2008 | Glen et al. | |
| 7,503,081 B2 | 3/2009 | Montgomery | |
| 7,832,890 B2 | 11/2010 | Jesse | |
| 8,096,678 B2 | 1/2012 | Jones, et al. | |
| 8,206,003 B1 * | 6/2012 | LaBarge | F21L 4/08 206/389 |
| 8,258,708 B2 | 9/2012 | Van De Sluis et al. | |
| 8,318,273 B2 | 11/2012 | Lai | |
| 8,393,755 B2 | 3/2013 | Chien | |
| 9,140,416 B2 | 9/2015 | Bostic | |
| 2004/0062047 A1 * | 4/2004 | Camarota | A47K 3/003 362/399 |
| 2005/0201082 A1 * | 9/2005 | Mauk | F21S 8/06 362/147 |
| 2006/0152917 A1 * | 7/2006 | Stuhlmacher | E03C 1/04 362/109 |
| 2007/0047224 A1 | 3/2007 | Lee | |
| 2007/0258258 A1 * | 11/2007 | Wang | E05B 17/10 362/501 |
| 2008/0184475 A1 | 8/2008 | Sladick et al. | |
| 2008/0205034 A1 * | 8/2008 | Kunkel | F21V 3/049 362/101 |
| 2008/0259615 A1 * | 10/2008 | Chien | F21S 9/022 362/382 |
| 2008/0266844 A1 | 10/2008 | Reynolds et al. | |
| 2008/0271238 A1 * | 11/2008 | Reeder | A46B 7/04 4/597 |
| 2008/0291660 A1 * | 11/2008 | Gautschi | G02B 6/0008 362/96 |
| 2009/0034245 A1 * | 2/2009 | Esses | A47G 11/003 362/158 |
| 2009/0185366 A1 * | 7/2009 | Beaulieu | F21V 33/0012 362/133 |
| 2009/0316385 A1 * | 12/2009 | Weber | G02B 6/0006 362/92 |
| 2012/0023651 A1 | 2/2012 | Taylor et al. | |
| 2012/0140493 A1 * | 6/2012 | Tarr | F21V 23/04 362/404 |
| 2012/0162973 A1 | 6/2012 | Carter | |
| 2014/0036484 A1 * | 2/2014 | Kalb | F21S 9/037 362/154 |
| 2014/0376231 A1 * | 12/2014 | Cox, Jr. | F21V 29/70 362/294 |
| 2015/0092408 A1 * | 4/2015 | Wallach | H05B 47/105 362/233 |
| 2015/0131287 A1 * | 5/2015 | Marsh | F21V 19/04 362/260 |
| 2015/0247307 A1 | 9/2015 | Reeder et al. | |
| 2015/0351195 A1 | 12/2015 | Sargent et al. | |
| 2016/0040841 A1 * | 2/2016 | Martzall | H05B 47/11 362/183 |
| 2016/0047537 A1 * | 2/2016 | Stolte | H05B 47/19 362/276 |

FOREIGN PATENT DOCUMENTS

| | | |
|---|---|---|
| CN | 203413600 U | 1/2014 |
| JP | 2015-508563 | 3/2015 |
| KR | 20070069665 A | 7/2007 |

OTHER PUBLICATIONS

*Refraction of Light*; http://hyperphysics.phy-astr.gsu.edu/hbase/geoopt/refr.html; Apr. 17, 2017.

*PureDesign Dry Clean : A Towel Drier and Disinfecter*; http://interiordesigner55.com/puredesign-dry-clean-towel-drier-disinfecter/; Jun. 2, 2017.

*Sound Activated Nightlight Toilet Seat*; http://www.sharperimage.com/si/view/product/Sound+Activated+Nightlight+Toilet+Seat/203661?trail=; Jun. 2, 2017.

\* cited by examiner

MOUNTABLE FIXTURE WITH SENSOR ACTIVATED LIGHTING

RELATED APPLICATIONS

This application claims priority to U.S. Application No. 62/341,809, filed May 26, 2016, which is hereby incorporated herein by reference in its entirety.

TECHNICAL FIELD

The present disclosure relates generally to home fixtures or accessories. In particular, the present disclosure relates to a fixture that incorporates an illumination device to provide illumination to an area surrounding the fixture.

BACKGROUND

Home fixtures and accessories are often positioned in locations or on surfaces that permit a user to access items on the fixtures or accessories quickly and efficiently. Standard fixtures are typically constructed out of materials and finishes that permit the fixture to withstanding daily usage, and often fixtures are coordinated to have similar materials and designs within a designated area. Such fixtures typically have a design that is part aesthetic and part functional. Often, the fixture may be constructed out of opaque materials, such as metal or thick plastic, and may be affixed to a wall or other similar surface within a room in which a user may utilize items retained on the fixture.

Certain types of fixtures, such as a towel ring, are configured to maintain useful items (e.g., a towel) in close proximity to where a user may need it, for example, in a bathroom or near a sink. Such fixtures may be used in variant lighting conditions as well, for example, at night or when a room is in a darkened condition. However, as users may be unable to see or detect the fixture, or any items located on or retrained by the fixture, in low level lighting conditions. Similarly, a user may not be able to detect items and objects near the fixture in such low level lighting conditions. Accordingly, there is a need for a means to provide illumination to an area surrounding a fixture when the ambient light is in a low level condition or there is no ambient light surrounding the fixture.

SUMMARY

According to one aspect of the present disclosure, a fixture is provided that includes a hub body that is configured about a hub axis and formed to include a cavity at least partially defined by the hub body. The hub body includes a first end and a second end, with an opening extending through the second end. The hub body is comprised of a non-transparent material. The fixture further includes a mounting plate configured to be secured to the second end of the hub body and may extend within the opening of the second end. The mounting plate is configured to secure the hub body to an external surface upon which the fixture is secured. The mounting plate is comprised of translucent material and includes an outer annular surface through which light can be transmitted. The fixture further includes a system of electronic components including a sensor system, a controller, and a light generating unit. The light generating unit includes at least one light. The system is contained within the cavity of the hub body, and the controller is configured to generate a light beam from the light based on input received from the sensor system. In various embodiments, the sensor system includes both a motion detector sensor and an ambient light sensor that can detect and transmit information regarding the area surrounding the fixture.

Additional features of the present disclosure will become apparent to those skilled in the art upon consideration of illustrative embodiments including the best mode of carrying out the disclosure as presently perceived.

BRIEF DESCRIPTION OF THE FIGURES

The detailed description makes reference to the accompanying figures in which.

DETAILED DESCRIPTION

The figures and descriptions provided herein may have been simplified to illustrate aspects that are relevant for a clear understanding of the herein described products, devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
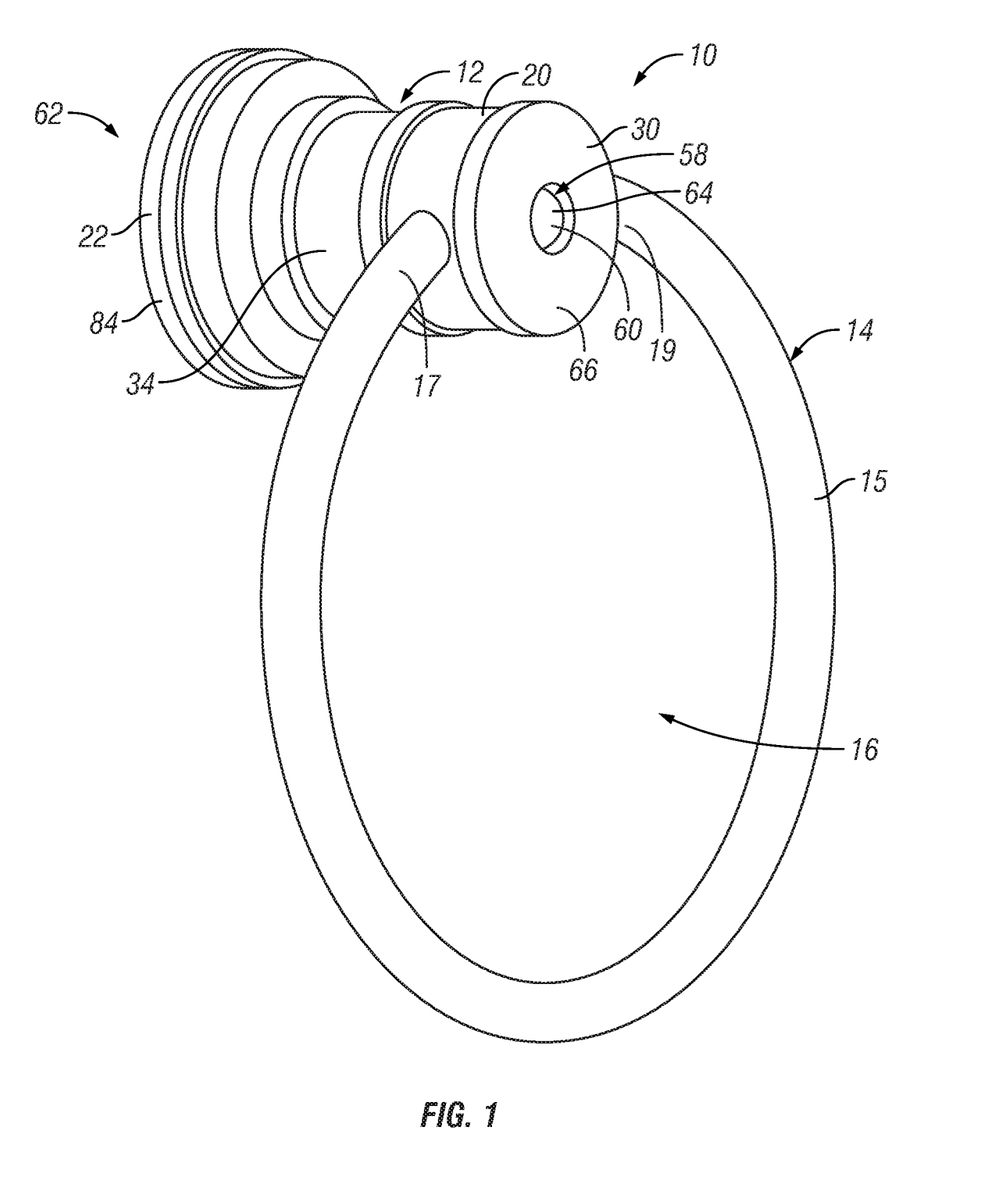
FIG. 1 is a perspective view of an example of an illuminating towel fixture according to an exemplary embodiment of the disclosure.

FIG. 1 shows an exemplary illuminating fixture 10, namely a towel fixture, according to an embodiment of this disclosure. Although this disclosure will be discussed with regard to a towel fixture for purposes of example, the method and apparatus for illuminating described herein could be implemented in any type of fixture, including other types of towel fixtures, paper fixtures/holders, hooks, pulls, handles, shelves, brackets and/or mounting hardware. In the example shown, the fixture 10 includes a fixture or accessory hub 12 and a towel holder 14 coupled to the accessory hub 12. The accessory hub 12 is configured to be mounted or affixed to a wall or other surface (not shown) within a room so as to provide a user with ease of access to a towel (not shown) or other object retained on or within the towel holder 14 connected to the accessory hub 12. In various embodiments, the towel holder 14 may be comprised of a ring or annularly-shaped bar 15, wherein the towel or similar item is retained within an opening 16 formed in the holder 14, the opening 16 circumscribed by the bar 15. Other forms and shapes of a towel holder 14 are envisioned within the scope of this disclosure. Further, other means for retaining a towel or similar items are generally known in the art.

Figure 2:
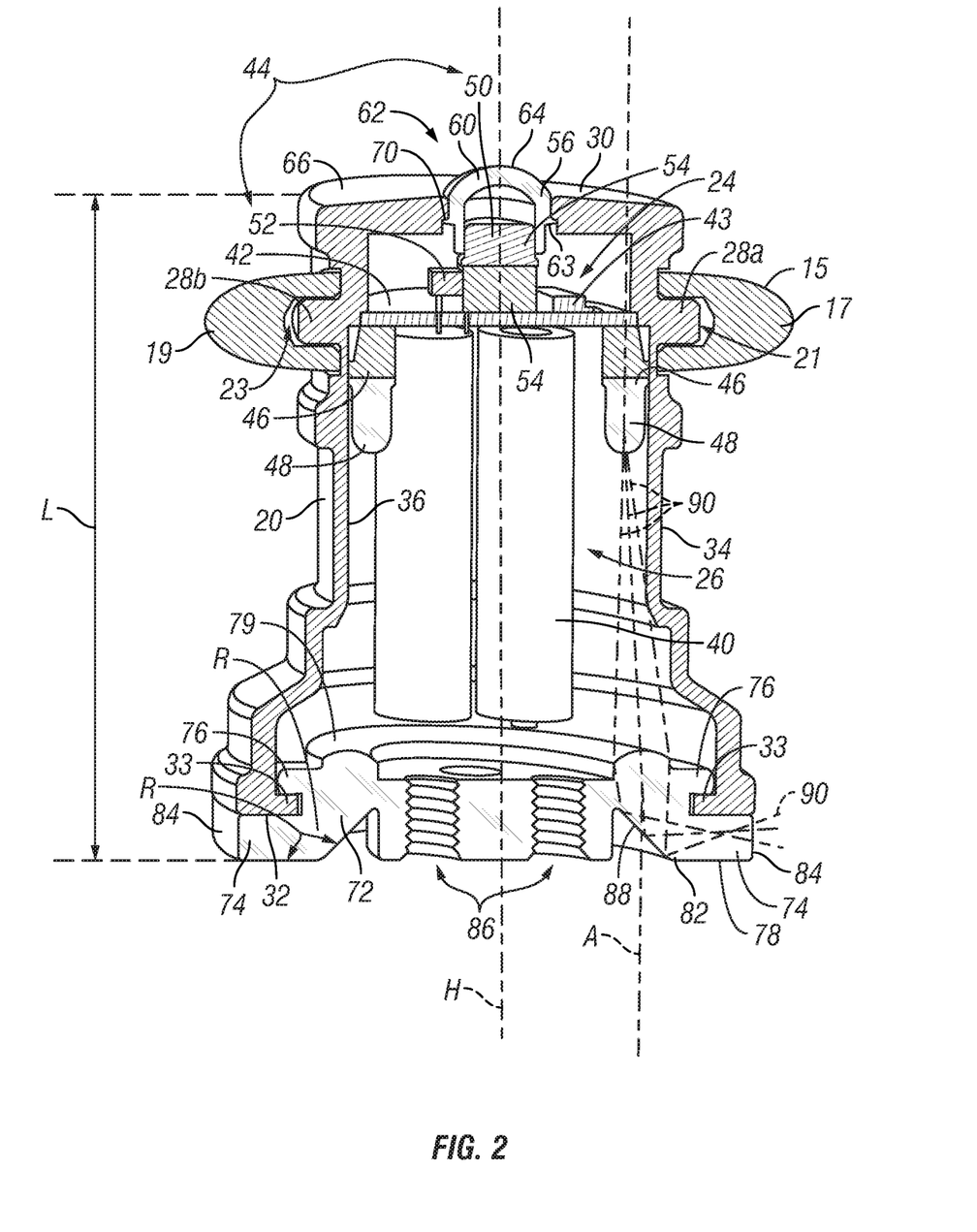
FIG. 2 is a cross-sectional view of an accessory hub of the fixture of FIG. 1.
Figure 3:
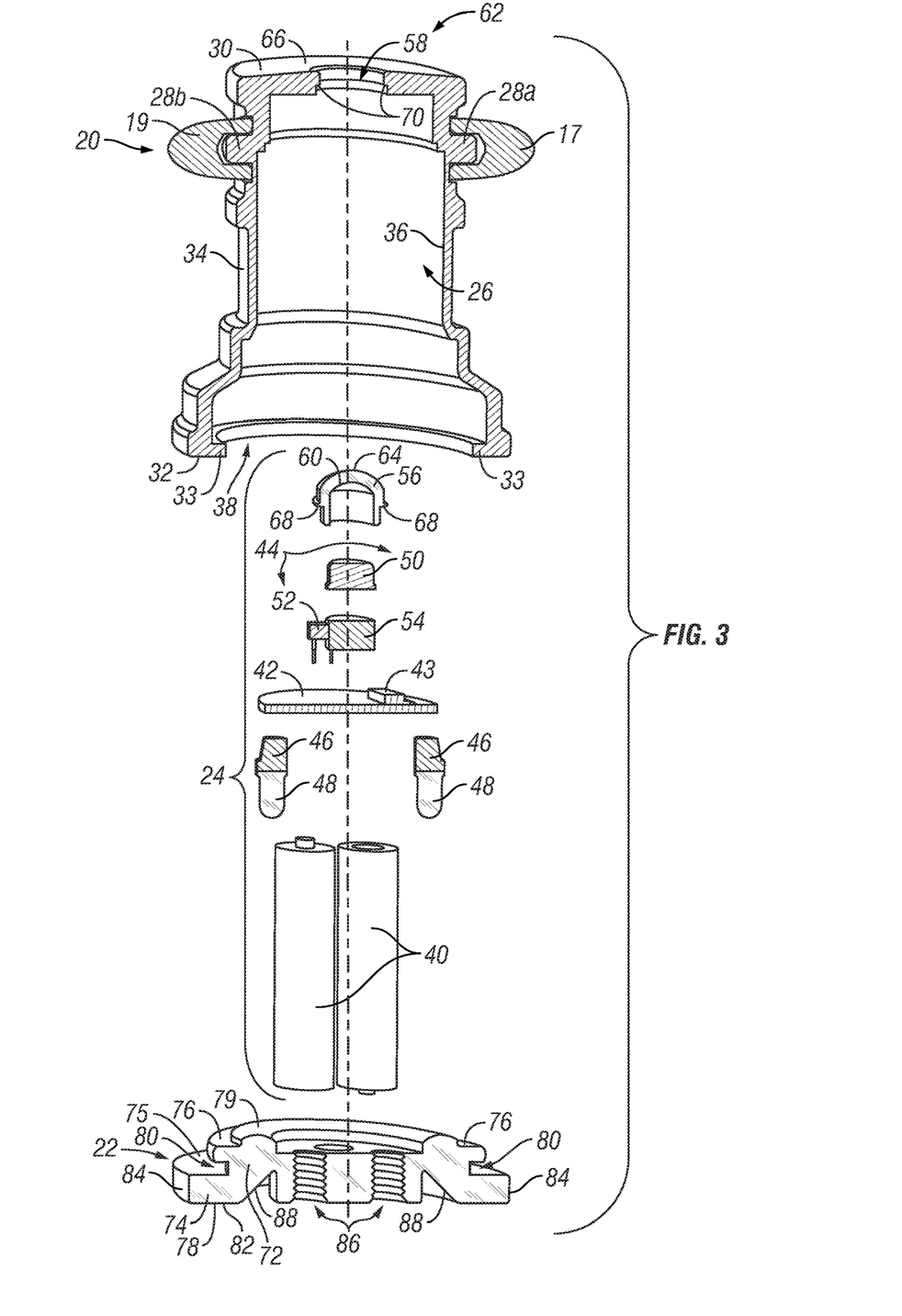
FIG. 3 is a an exploded view of the accessory hub of FIG. 2.

In an illustrative embodiment and as seen in FIGS. 2-3, the fixture hub 12 includes a hub body 20, a mounting plate 22 that may be coupled to the hub body 20, and a system 24 of electronic components and sensors generally housed in a cavity 26 of the hub body 20. In various embodiments, the hub body 20 includes one or more retainers 28 (FIG. 2) that permit the towel holder 14 to be coupled to the hub body 20. For example, a first end 17 of the bar 15 may be configured to be received on a first retainer 28a, and a second end 19 of the bar 15 of the towel holder 14 may be configured to be received on a second retainer 28b, as illustrated in FIG. 2. In various embodiments, retainers 28a and 28b may be received within apertures 21 and 23 formed in the first and second ends 17 and 19 of the bar 15, and the bar 15 may be rigid enough to be maintained securely on the retainers 28a and 28b. Other forms of attachment of the towel bar 14 are envisioned within the scope of this disclosure.

In various embodiments, the hub body 20 includes a first end 30, a second end 32, an outer surface 34 extending between the first and second ends 30 and 32, and an inner surface 36 extending between the first and second ends 30 and 32. In various embodiments, the hub body 20 may be positioned about a hub axis H, as illustrated in FIGS. 2-3. The inner surface 36 of the hub body 20 generally defines the cavity 26 of the hub body 20. An exemplary embodiment of the hub body 20 is a hub body having a generally annular or circular cross-sectional shape (for a cross-section taken at points along a length L of the hub body 20) as illustrated in FIGS. 1-2, although other cross-sectional shapes of the hub body 20, such as squares or rectangles, are envisioned within the scope of this disclosure. As illustrated in FIGS. 1-3, the hub body 20 may have varying diameter sizes at various points along the length L of the hub body 20 that may be configured to provide aesthetic appeal or visual intrigue for the fixture 10. It is envisioned that the hub body 20 may be formed of metal, plastic or any other suitable material capable of being utilized in a manner disclosed herein. As illustrated in FIGS. 1-3, the retainers 28 may be integrally formed as part of the outer surface 34, or may be coupled to the outer surface 34, to retain the towel holder 14 to the hub body 20.

As illustrated in FIG. 3, the cavity 26 of the hub body 20 may be accessed via an opening 38 formed in the second end 32 of the hub body 20. In various embodiments, the opening 38 is circumscribed by an annular lip 33 of the second end 32. As illustrated, the annular lip 33 may be formed to extend annularly inward into the opening 38 from the second end 32 of the hub body 20. The mounting plate 22 may be configured to be received within the opening 38 formed in the second end 32 in order to mount the hub body 20 to a wall or other surface (not shown) via the mounting plate 22. As illustrated in FIGS. 2-3, the electrical system 24 may be positioned within the cavity 26 before the mounting plate 22 is secured to the hub body 20 to be retained therein. In various embodiments, the mounting plate 22 is configured to be removable from the hub body 20 in order to permit access to the electrical system 24, for instance, to replace components of the electrical system if necessary.

Figure 4:
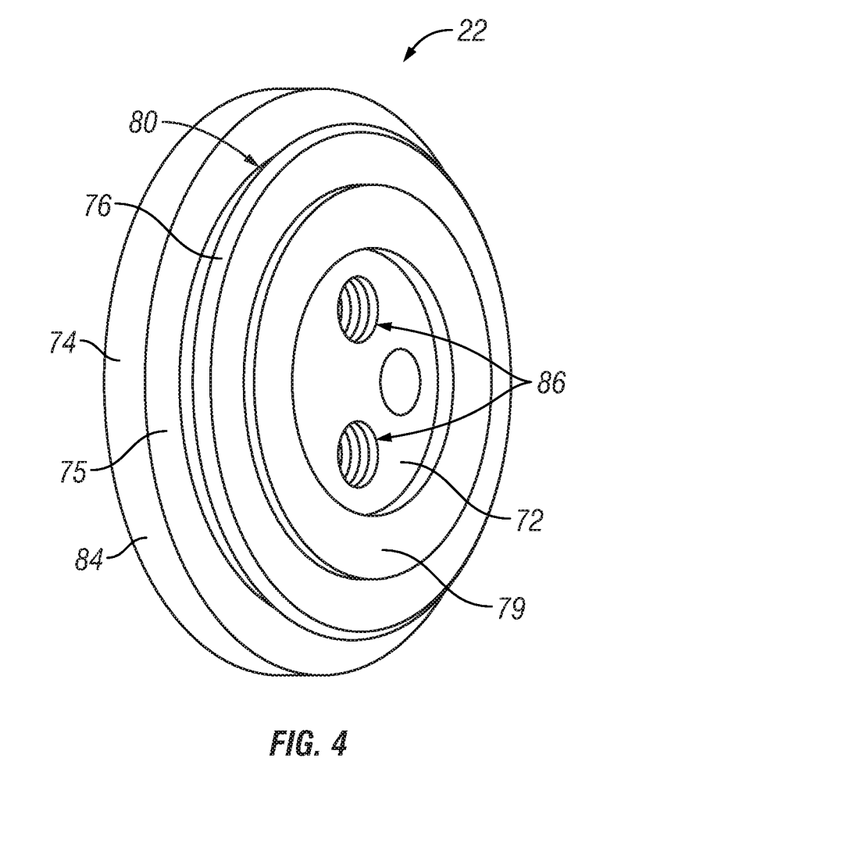
FIG. 4 is a front perspective view of a mounting plate of the accessory hub of the fixture of FIG. 1.

FIGS. 2-4 illustrate an exemplary embodiment of the mounting plate 22. As illustrated, the mounting plate 22 comprises a mounting body 72, an annular mounting ring 74 coupled to the mounting body 72, and an annular retainer 76 also coupled to the mounting body 72. The mounting plate 22 comprises a top surface 79 and a back surface 82 that define spaced apart ends of the mounting plate 22. The annular mounting ring 74 includes a back surface 78 and a front surface 75 spaced apart from the back surface 78. In illustrative embodiments, the annular mounting ring 74 is positioned to be in unitary arrangement with the mounting body 72. For instance the back surface 78 of the annular mounting ring 74 may be aligned with the back surface 82 of the mounting plate 22. The back surface 78 of the annular mounting ring 74 and the back surface 82 of the mounting body 72 may be positioned against a wall or surface (not shown) upon which a user desires to mount the fixture 10, as is understood by one of ordinary skill.

In various embodiments, the annular retainer 76 may be generally in parallel alignment with the annular mounting ring 74, with the annular retainer 76 spaced apart from the annular mounting ring 74 to form a mounting gap 80 therebetween. The annular lip 33 of the second end 32 of the hub body 20 may be configured to be received within the mounting gap 80 to retain the hub body 20 on the mounting plate 22. In various embodiments, the mounting plate 22 may be comprised of translucent material that permits light to travel through the surfaces of the mounting plate 22. Portions of the mounting plate 22, such as the annular retainer 76, may be comprised of flexible or semi-flexible material, such as plastic, to permit a snap-fit connection with the hub body 20, such as with the annular lip 33. Other types of material are also envisioned within the scope of this disclosure, however. In various embodiments, the second end 32 of the hub body 20 may be configured to abut against a portion of the front surface 75 of the mounting ring 74, as illustrated in FIGS. 2-3.

In various embodiments, the mounting plate 22 includes an annular outer surface 84. The annular outer surface 84 may generally define the outer circumference of the mounting plate 22. In an illustrative example, the annular outer surface 84 may be configured as a portion of the annular mounting ring 74, as illustrated in FIGS. 2-4, although other locations for the annular outer surface 84 are envisioned herein. The annular outer surface 84 may be generally perpendicular to the surface (not shown) upon which the mounting plate 22 is to be mounted, and/or may be generally perpendicular to the front surface 75 and back surface 78 of the mounting ring 74. Portions of the mounting plate 22, such as at least the annular outer surface 84, may be comprised of material that permits light to travel through, such as a translucent plastic.

In various embodiments, the mounting plate 22 further includes an annular reflecting surface 88. As illustrated in FIGS. 2-3, the annular reflecting surface 88 may be positioned radially inward of the outer annular surface 84 and be configured to extend radially inwardly and towards the top of the mounting plate 22 (away from the back surface 82). The annular reflecting surface 88 may be positioned adjacent to the back surface 82 of the mounting plate 22, with the annular reflecting surface 88 being at an angle with respect to the back surface 82 of the mounting plate 22. In particular, in various embodiments, the annular reflecting surface 88 may be at an angle R with respect to the back surface 82 of the annular mounting ring 74. Similarly, the annular reflecting surface 88 may further be at an angle with respect to the back surface 78, front surface 75, or outer surface 84 of the annular mounting ring 74, such that the annular reflecting surface 88 is neither perpendicular to nor parallel with surfaces 75, 78, or 84. It is envisioned herein that the angle R may be of various measurements. For example, the angle R may be governed by the position of the light source, the position/target that the light needs to exit through (e.g. the outer surface 84) and the shape of the reflecting surface 88 or other lens that refracts light. An exemplary embodiment of the angle R may be 135 degrees. When the angle R is 135 degrees, the reflecting surface 88 may generally be at a 45 degree angle in relation to the annular outer surface 84 when the annular outer surface 84 is perpendicular to the back surface 82 of the mounting ring 74, and may further be at a 45 degree angle with respect to the longitudinal axis. It is contemplated that the angle R and the reflecting surface 88 may be configured to reflect (or change the direction of) light generated inside the hub body 20 so that such light is configured to travel through the outer surface 84. Other angular relationships between the reflecting surface 88 and the annular outer surface 84 are generally envisioned herein, however, and may depend on the relative angle of the outer surface 84 to the axis H of the hub body 20 or the back surface 82 of the mounting ring 74, for instance.

The mounting plate 22 may optionally include means for mounting the mounting plate 22 on the surface (not shown) that a user desires to secure the fixture 10. In various embodiments, the mounting plate 22 is formed to include one or more screw holes 86 through which screws (not shown) may extend to secure the mounting plate 22 to the surface. The screw holes 86 may be configured to extend through the mounting body 72 to permit access to the cavity 26 when the hub body 20 is mounted to the mounting plate 22.

In various embodiments, the electrical system 24 includes one or more batteries 40, a printed circuit board assembly (PCBA) 42 connected to the one or more batteries 40, a sensor system 44 coupled to the PCBA 42, and a light generating unit 46 also coupled to the PCBA 42. The batteries 40 may be configured to provide power to operate the sensor system 44 and/or the light generating unit 46 via the PCBA 42, as is known in the industry. The PCBA 42 is configured to control operation of the sensor system 44 and/or light generating unit 46. In various embodiments, the PCBA comprises a microcontroller 43 that can monitor the sensor system 44 and/or control the light generating unit 46. The light generating unit 46 may be configured to include one or more lights 48. In various embodiments, the lights 48 may be comprised of LEDs, although other forms of lights are envisioned within the scope of this disclosure.

As illustrated in FIGS. 2-3, the sensor system 44 may be comprised of a motion or proximity sensor 50 and an ambient light sensor 52. The sensor system 44 may alternatively be comprised of just a proximity sensor 50 or an ambient light sensor 52, or may further include other types of sensors (not shown) known in the art. The motion sensor 50 may be configured to detect motion or movement adjacent the fixture 10, while the ambient light sensor 52 may be configured to detect the amount of ambient or surrounding light that is adjacent the fixture 10. The proximity sensor 50 and/or ambient light sensor 52 may be electronically coupled to the PCBA 42 via a connecting circuit 54 that permits information obtained by the sensors 50 and 52 to be transmitted to the PCBA 42.

While the motion sensor 50 and/or the ambient light sensor 52 are configured to be located within the cavity 26 of the hub body 20, the motion sensor 50 and/or the ambient light sensor 52 can sense movement and/or light outside the hub body 20 and adjacent the fixture 10 via one or more translucent surfaces 56 that are located adjacent the first end 30 or outer surface 34 of the hub body 20. For example, as illustrated in FIGS. 2-3, a translucent surface 56 may extend within an opening 58 formed in the first end 30 of the hub body 20. In various embodiments, the translucent surface 56 may be in the form of a dome 60 that is comprised of translucent material, the dome extending from within the cavity 26 of the hub body 20 to an external area 62 outside of the hub body 20 such that a tip 64 of the dome 60 extends past an outside surface 66 of the first end 30. The dome 60 may also comprise a Fresnel lens to extend the viewing area of the sensor assembly 44. In other embodiments, the dome 60 may not extend past the outside surface 66 first end 30.

The translucent surface 56 may be coupled to the hub body 20 via any known means, such as connection flanges 68 that may be received within a ledge 70. Other means of attaching the translucent surface 56 to the hub body 20 are known in the art. In certain embodiments, the translucent surface 56 provides means for the motion sensor 50 to detect motion in the area surrounding the fixture 10, for example, by enabling the motion sensor 50 to have visible access to the area surrounding the fixture 10. In illustrative embodiments, the translucent surface 56 is configured to transmit the ambient light surrounding the fixture 10 to the ambient light sensor 56. In illustrative embodiments the connection flanges 68 may also be comprised of translucent material and configured to transmit ambient light surrounding the fixture to the ambient light sensor 56. Other variations of receiving movement and ambient light information from the surrounding area are envisioned herein.

As illustrated in FIG. 2, the sensor system 44 may be configured to detect information regarding the environment in the external area 62 surrounding the fixture 10 and transmit that information to the PCBA 42 to control operation of the light generating unit 46. As an illustrative example, the motion sensor 50 may be configured to detect movement adjacent the fixture 10, for example, when a person enters the room containing the fixture 10. The motion sensor 50 may then send a signal to the PCBA 42, which may be configured to turn on the light generating unit 46 when movement is detected. At the same time, the ambient light sensor 52 may be configured to detect the amount of light in the external area 62 surrounding the fixture 10 (e.g. the room in which the fixture 10 is located). Information about the amount of light may be transmitted from the ambient light sensor 52 to the PCBA 42, which can then compare such information to a predetermined amount of light within the external area 62 (e.g. a specific watt or wavelength). The predetermined amount of light may be configured to correspond with enough light to permit good visibility within the room, although it may be determined based on other factors as well. If the PCBA 42 determines that the amount of light located within the external area 62 is equal to or higher than the predetermined amount of light, the PCBA 42 may override the signal to turn on the light generating unit 46, thereby preventing the light 48 from being turned on, or turning the light 48 off if it was already on.

As illustrated in FIG. 2, the light 48 of the electrical system 24 may generally be located to direct one or more light beams 90 from the light 48 along a light axis A. In various embodiments, the light axis A may be generally parallel to the annular outer surface 84 of the mounting plate 22 and perpendicular to the back surface 82 of the annular mounting ring 74. The light 48 may be positioned such that the light beams 90 are directed toward the mounting plate 22 to permit the light beams 90 to reflect off the reflecting surface 88 toward the annular outer surface 84 of the mounting plate 22, as illustrated in FIG. 2. The top surface 79 of the mounting plate 22 may also act like a lens to focus (via refraction) the light onto the reflecting surface 88. In an exemplary embodiment, the light axis A may intersect the reflecting surface 88, although it is not necessary for the light axis A to intersect the reflecting surface 88, as long as light beams 90 are configured to be reflected off of the reflecting surface 88. As the light beams 90 travel through the mounting plate 22 to the annular outer surface 84, the annular outer surface 84 is illuminated by the light beams. When the mounting plate 22 is mounted on a room surface (not shown), such as a wall, the annular outer surface 84 of the mounting plate 22 will generally be positioned adjacent the room surface. As light beams 90 travel through the annular outer surface 84 to illuminate the outer surface 84, portions of the room surface will accordingly be illuminated too.

The present disclosure encompasses various forms and configurations of refracting and reflecting light beams 90 to an outer annular surface 84 of a mounting plate 22 of a fixture 10 when the light beams 90 were generated by a light generating unit 46 located inside a cavity 26 of a hub body 20 of the fixture 10. As the hub body 20 will typically be comprised of solid material, such as metal or thick plastic, that is not translucent, the light beams 90 traveling through the cavity 26 will generally not be visible through the hub body 20. However, as the mounting plate 22 is comprised of translucent material, the light beams 90 reflected through the mounting plate 22, such as through the outer annular surface 84, should be visible through the mounting plate 22 in the external area 62 surrounding the fixture 10. Accordingly, the combination of the non-translucent hub body 20 and the translucent mounting plate 22 permit external illumination of specific portions of the fixture 10. It can be appreciated that the fixture 10 can be designed to illuminate various portions of the fixture 10, depending on the material selected for such portions, and that the light beams 90 can be reflected off various surfaces of the fixture 10 that are angled or positioned with respect to a light generating unit 46 in order to cause such illumination, depending on the location of the portion being illuminated.

In illustrative embodiments, the electrical system 24 is configured to provide illumination to the external area 62 surrounding the fixture 10 based on whether there is a person located in the room of the fixture 10 and/or whether there is already enough ambient light within the room of the fixture 10. For example, if the room in which the fixture 10 is located is dark, the electrical system 24 may operate to illuminate the mounting ring 74, such as the outer annular surface 84, and optionally illuminate the room surface on which the fixture 10 is mounted, when a person enters the room in order to act as a navigational guide and point of reference for the person in the room. The fixture 10 may also be illuminated in order to shed light on the external area 62 surrounding where the fixture 10 is mounted. However, if the electrical system 24 detects that there is sufficient ambient light in the room in which the fixture 10 is located, the electrical system 24 may not illuminate the light generating unit 46 (or may turn it off if it was previously on), and accordingly the mounting ring 74 will not be illuminated.

Figure 5:
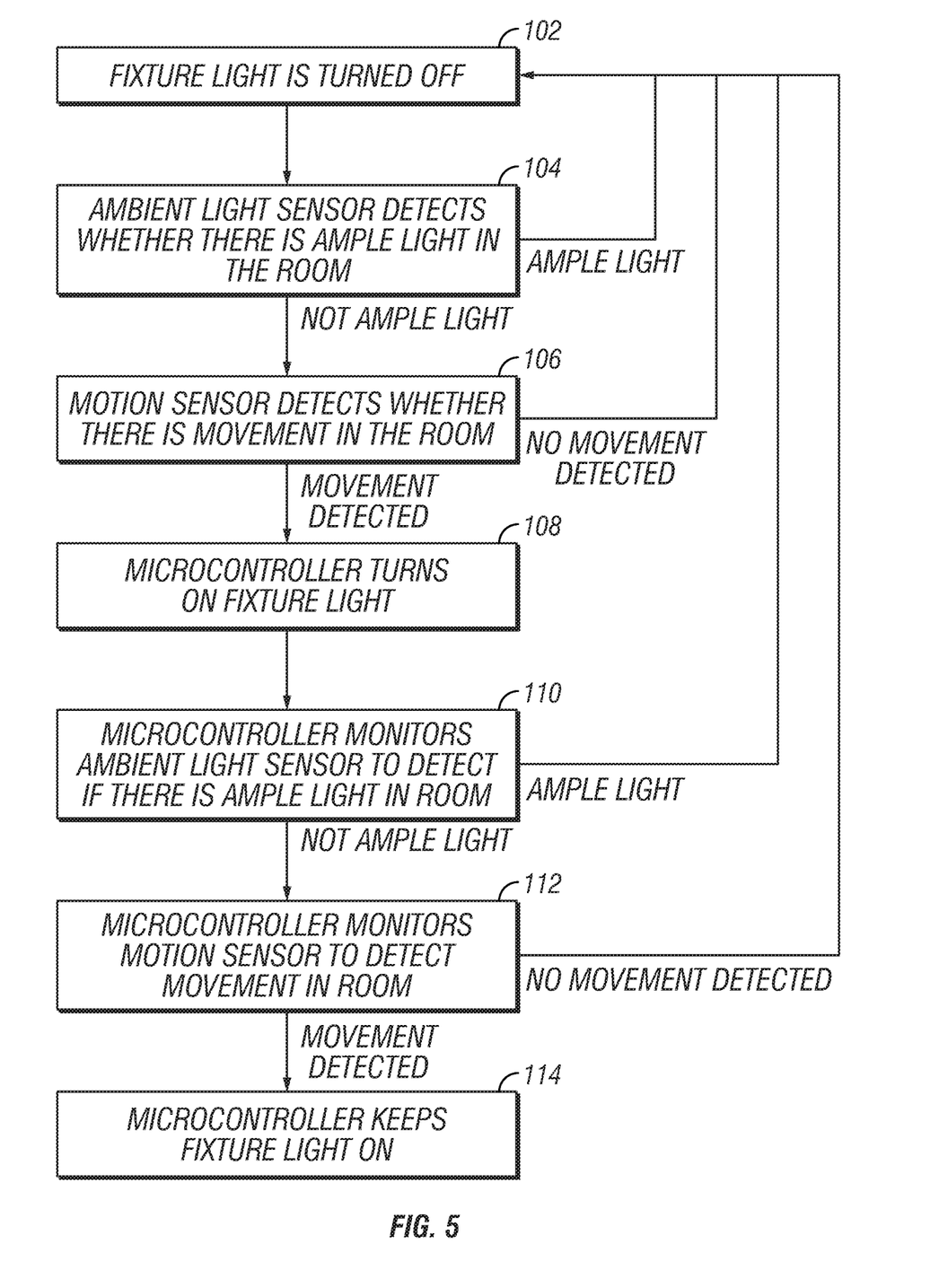
FIG. 5 is a simplified flowchart showing an example operation of an illuminating fixture according to an embodiment of the disclosure.

FIG. 5 illustrates a flow chart of an exemplary process of operating the electrical system 24 and the light generating unit 46 of the fixture 10. The light 48 within the fixture 10 is initially turned off in a first step 102. The electrical system 24 is configured to detect whether there is predetermined amount of light within the room (e.g. an adequate amount of light for a person to see) via an ambient light sensor 52 in a second step 104. If the electrical system 24 detects that there is an ample amount of light in the room, then the light 48 remains off. If the electrical system 24 detects that there is not an ample amount of light in the room, then the electrical system 24 utilizes a motion sensor 50 in a third step 106 to detect whether there is movement within the area surrounding the fixture 10 (e.g. whether a person had entered the room). If the electrical system 24 does not detect movement, then the light 48 remains off. If the electrical system 24 detects movement in the room, then the electrical system 24 is configured to turn on the light 48 in a fourth step 108, which will generate light beams 90 that will illuminate a portion of the fixture 10, such as the mounting ring 74 or more particularly the outer annular surface 84 of the mounting ring 74. The illumination can then provide a person with a navigational aid or point of reference.

The electrical system 24 may also be configured to control the light 48 based on changes in the surrounding area. For instance, in a fifth step 110, the electrical system 24 may (via, for example, a microcontroller 43) monitor, at predetermined time intervals after the light 48 has been turned on, whether the light within the room has reached the predetermined amount. If the electrical system 24 detects that there is ample light in the room, then the electrical system 24 may turn off the light 48. If the electrical system 24 detects that there is not an ample amount of light in the room, then the electrical system 24 utilizes the motion sensor 50 in a sixth step 112 to detect, at predetermined time intervals, whether there is movement within the area surrounding the fixture 10 (e.g. whether the person is still in the room). If the electrical system 24 does not detect any more movement in the room, then the electrical system may turn off the light 48. If the electrical system does detect movement in the room, then the electrical system will maintain powering the light 48 on in a seventh step 114.

Examples

Illustrative examples of the illuminated fixture disclosed herein are provided below. An embodiment of the illuminated fixture may include any one or more, and any combination of, the examples described below.

Example 1 is an illuminated fixture that includes a hub body configured about a hub axis and formed to include a cavity. The hub body includes a first end and a second end, wherein an opening extends through the second end, and is comprised of a nontransparent material. The fixture further includes a mounting plate configured to be secured to the second end of the hub body. The mounting plate is configured to secure the hub body to an external surface. The mounting plate includes an outer annular surface that is comprised of translucent material. The fixture further includes a system of electronic components that has a sensor system, a controller, and a light generating unit that includes at least one light. The system is contained within the cavity of the hub body, and the controller is configured to generate a light beam via the light generating unit based on input from the sensor system. The system is further configured to generate the light beam to be transmitted to the outer annular surface of the mounting plate.

In Example 2, the subject matter of Example 1 is further configured such that the mounting plate includes a reflecting surface that reflects the light beam to the outer annular surface.

In Example 3, the subject matter of Example 2 is further configured such that the reflecting surface is configured to intersect a light axis of the light generating unit.

In Example 4, the subject matter of Example 3 is further configured such that the reflecting surface is oriented with respect to the light beam to reflect the light beam outwardly from the hub axis.

In Example 5, the subject matter of Example 2 is further configured such that the reflecting surface is annular about the hub axis of the hub body.

In Example 6, the subject matter of Example 1 is further configured such that the second end of the hub body includes an annular lip that is configured to be received in a mounting gap of the mounting plate.

In Example 7, the subject matter of Example 1 is further configured such that the sensor system includes an ambient light sensor and a motion sensor.

In Example 8, the subject matter of Example 7 is further configured such that the controller is configured to turn on the light generating unit when the motion sensor detects motion in an area adjacent the fixture.

In Example 9, the subject matter of Example 8 is further configured such that the ambient light sensor is configured to detect the amount of ambient light in the area adjacent the fixture, wherein the controller is configured to determine whether the amount of ambient light in the area meets a pre-determined amount, and wherein the controller is configured to prevent the light generating unit from being turned on when the ambient light in the area meets or exceeds the pre-determined amount.

In Example 10, the subject matter of Example 8 is further configured such that the controller is configured to turn off the light generating unit when the motion sensor fails to detect motion in the area after a predetermined amount of time.

In Example 11, the subject matter of Example 7 is further configured such that the ambient light sensor and the motion sensor receive information about the area surrounding the fixture via a translucent dome contained within a portion of the hub body.

In Example 12, the subject matter of Example 11 is further configured such that the translucent dome includes a tip portion that extends beyond an outside surface of the hub body.

In Example 13, the subject matter of Example 1 is further configured such that the fixture is one of a towel ring, robe hook, towel bar, shelf, or mounting hardware.

Example 14 is a method of providing illumination to an area adjacent a fixture. The method includes the steps of: detecting whether the area contains a predetermined amount of light; detecting whether there is movement within the area; turning on a light within an enclosed central cavity of the fixture if there is movement detected within the area and the area does not contain the predetermined amount of light; and directing a light beam from the light through a translucent mounting bracket of the fixture.

In Example 15, the subject matter of Example 14 is further configured wherein the step of directing a light beam further comprises transmitting the light beam to a reflecting surface that is positioned at an angle to an axis of the fixture and redirecting the light beam to an outer surface of the mounting bracket that is not perpendicular to the axis of the fixture.

In Example 16, the subject matter of Example 15 is further configured wherein the angle between the reflecting surface and the axis of the fixture is approximately 45 degrees.

In Example 17, the subject matter of Example 15 is further configured wherein the reflecting surface and outer surface are annular to the axis of the fixture.

Example 18 is a fixture with a hub body, a mounting plate, a system of electronic components and an optical assembly. The hub body is configured about a longitudinal axis and formed to include a cavity. The hub body includes a first end and a second end in which an opening extends through the second end. The mounting plate is configured to be secured to the second end of the hub body and configured to secure the hub body to an external surface. The hub body and/or mounting plate includes a transparent portion. The system of electronic components includes a sensor system, a controller, and a light generating unit that includes at least one light. The system is contained within the cavity of the hub body. The controller is configured to generate a light beam via the light generating unit based on input from the sensor system. The optical assembly is configured to direct the light beam outwardly from the longitudinal axis through the transparent portion.

In Example 19, the subject matter of Example 18 is further configured such that the optical assembly includes a reflecting surface that reflects the light beam through the transparent portion.

In Example 20, the subject matter of Example 19 is further configured such that the reflecting surface is oriented to reflect the light beam substantially transversely from the longitudinal axis of the hub body.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

We claim:

1. A fixture comprising:
    a hub body configured about a hub axis and formed to include a cavity, the hub body including a first end and a second end, wherein an opening extends through the second end, and wherein the hub body is comprised of a nontransparent material;
    a mounting plate configured to be coupled to the second end of the hub body and configured to secure the second end of the hub body via a mounting body to a surface external to the fixture immediately adjacent the second end of the hub body, the mounting plate including an outer annular surface comprised of translucent material; and
    a system of electronic components including a sensor system, a controller, and a light generating unit that includes at least one light, the system contained within the cavity of the hub body, and the controller configured to generate a light beam via the light generating unit based on input from the sensor system that may be transmitted to the outer annular surface of the mounting plate.

2. The fixture of claim 1, wherein the mounting plate includes a reflecting surface that reflects the light beam to the outer annular surface.

3. The fixture of claim 2, wherein the reflecting surface is configured to intersect a light axis of the light generating unit.

4. The fixture of claim 3, wherein the reflecting surface is oriented with respect to the light beam to reflect the light beam outwardly from the hub axis.

5. The fixture of claim 2, wherein the reflecting surface is annular about the hub axis of the hub body.

6. The fixture of claim 1, wherein the second end of the hub body includes an annular lip configured to be received in a mounting gap of the mounting plate.

7. The fixture of claim 1, wherein the sensor system includes an ambient light sensor and a motion sensor.

8. The fixture of claim 7, wherein the controller is configured to turn on the light generating unit when the motion sensor detects motion in an area adjacent the fixture.

9. The fixture of claim 8, wherein the ambient light sensor is configured to detect the amount of ambient light in the area adjacent the fixture, wherein the controller is configured to determine whether the amount of ambient light in the area meets a pre-determined amount, and wherein the controller is configured to prevent the light generating unit from being turned on when the ambient light in the area meets or exceeds the pre-determined amount.

10. The fixture of claim 8, wherein the controller is configured to turn off the light generating unit when the motion sensor fails to detect motion in the area after a predetermined amount of time.

11. The fixture of claim 7, wherein the ambient light sensor and the motion sensor receive information about the area surrounding the fixture via a translucent dome contained within a portion of the hub body.

12. The fixture of claim 11, wherein the translucent dome includes a tip portion that extends beyond an outside surface of the hub body.

13. The fixture of claim 1, wherein the fixture is one of a towel ring, robe hook, towel bar, shelf, or mounting hardware.

14. A fixture comprising:
a hub body configured about a longitudinal axis and formed to include a cavity, the hub body including a first end and a second end, wherein an opening extends through the second end;
a mounting plate configured to be secured to the second end of the hub body and configured to secure the second end of the hub body via a mounting body to a surface external to the fixture immediately adjacent the second end of the hub body, wherein the hub body and/or the mounting plate includes a transparent portion;
a system of electronic components including a sensor system, a controller, and a light generating unit that includes at least one light, the system contained within the cavity of the hub body, the controller configured to generate a light beam via the light generating unit based on input from the sensor system; and
an optical assembly configured to direct the light beam outwardly from the longitudinal axis through the transparent portion.

15. The fixture of claim 14, wherein the optical assembly includes a reflecting surface that reflects the light beam through the transparent portion.

16. The fixture of claim 15, wherein the reflecting surface is oriented to reflect the light beam substantially transversely from the longitudinal axis of the hub body.

* * * * *